July 31, 1934.  E. M. YOST  1,968,547
CONVEYING SYSTEM
Filed June 1, 1931   3 Sheets-Sheet 1
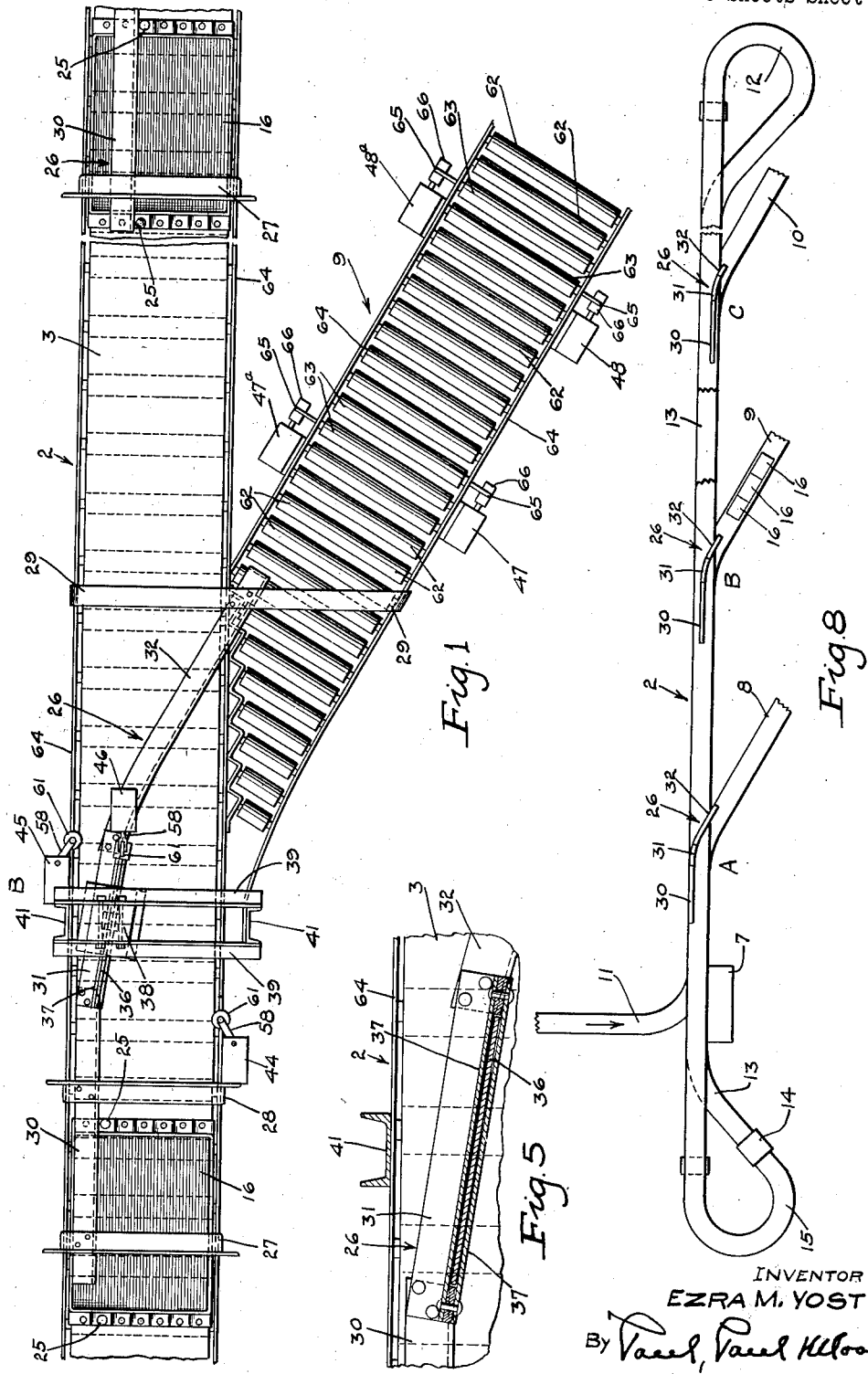
INVENTOR
EZRA M. YOST
By *Vasel, Vasel & Moore*
ATTORNEYS July 31, 1934.     E. M. YOST     1,968,547
CONVEYING SYSTEM
Filed June 1, 1931     3 Sheets-Sheet 2
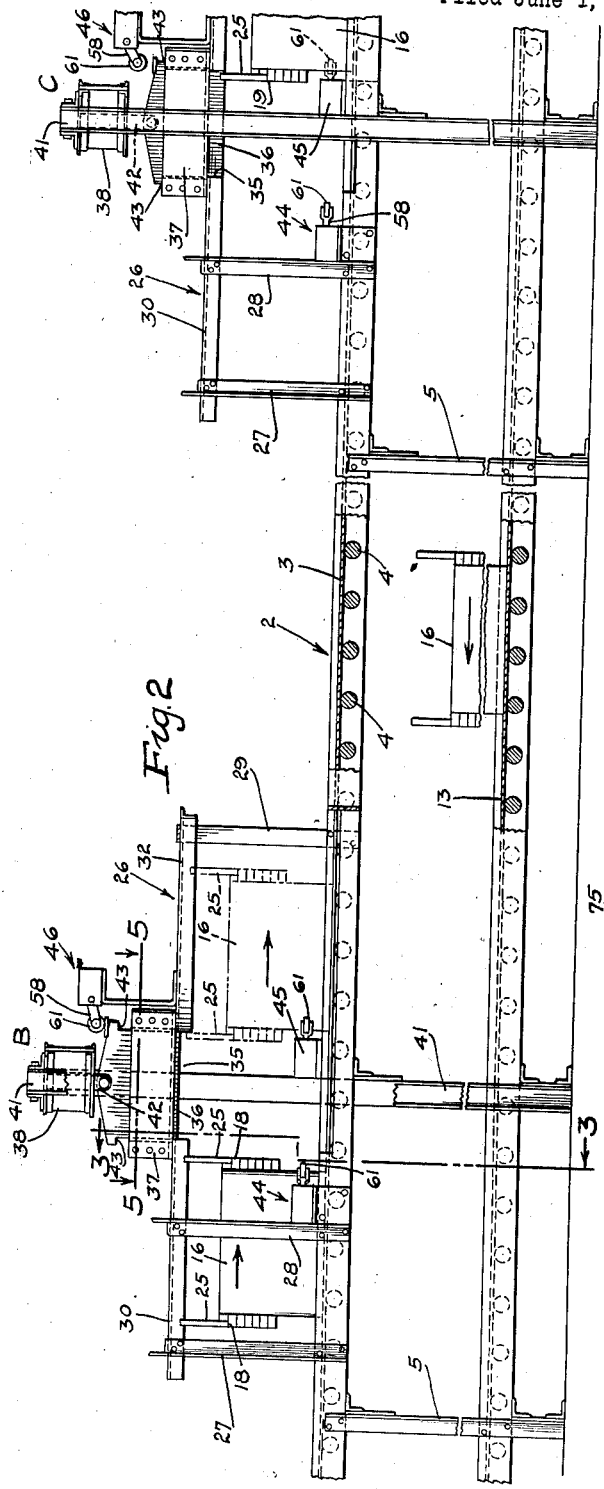
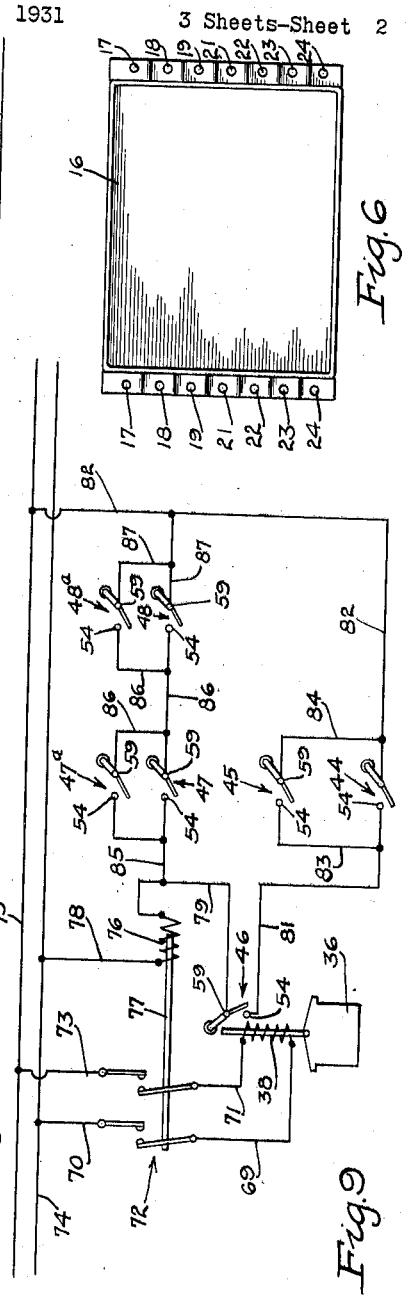
INVENTOR
EZRA M. YOST
By
ATTORNEYS July 31, 1934.  E. M. YOST  1,968,547
CONVEYING SYSTEM
Filed June 1, 1931  3 Sheets-Sheet 3
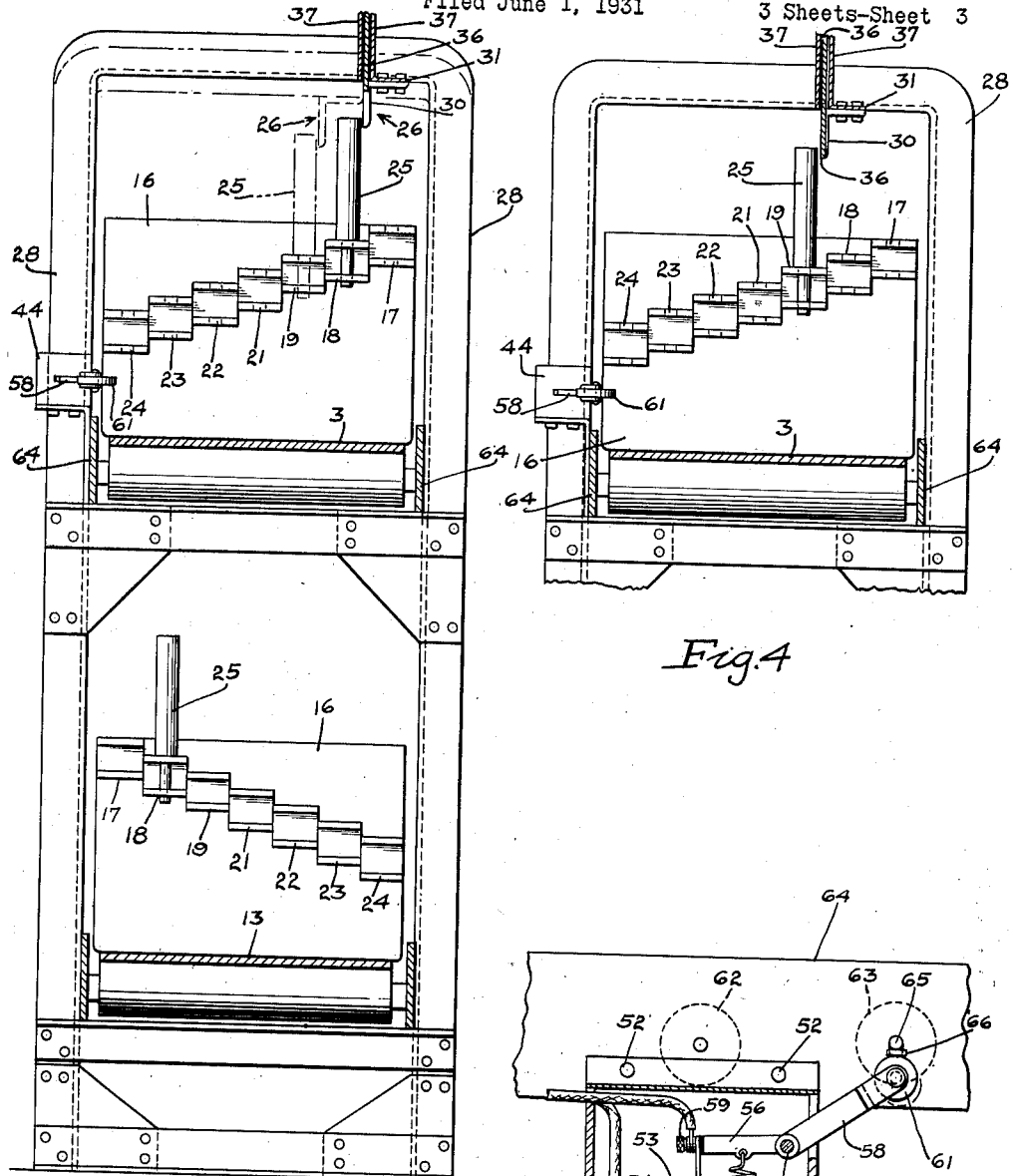
Fig. 3
Fig. 4
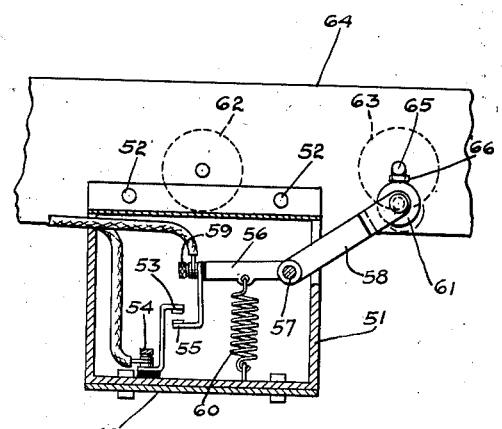
Fig. 7
INVENTOR
EZRA M. YOST
By
ATTORNEYS Patented July 31, 1934

1,968,547

UNITED STATES PATENT OFFICE 1,968,547

CONVEYING SYSTEM

Ezra M. Yost, Ellwood City, Pa., assignor to Mathews Conveyer Company, Ellwood City, Pa., a corporation of Pennsylvania Application June 1, 1931, Serial No. 541,351

22 Claims. (Cl. 198—38)

This invention relates to new and useful improvements in conveying systems, and more particularly to a switch mechanism adapted to divert articles or commodity carriers from a main conveyer onto a selected branch conveyer.

An object of the invention is to provide a conveying system comprising a main conveyer having a plurality of stations and carriers adapted to travel over said conveyer, and a switch mechanism being provided at each station including a fixed rail adapted to be engaged by means adjustably mounted on a carrier and positioned to engage the rail of a selected station, whereby the carrier will be diverted from the main conveyer at said selected station.

A further object is to provide in combination with a conveyer system comprising a main conveyer and a plurality of branch conveyers, a switch mechanism adapted to selectively divert carriers from the main conveyer onto a selected branch conveyer, each of said switch mechanisms comprising a rail adapted to be engaged by a control pin mounted upon a carrier, and means being provided upon the carriers whereby the control pins may be positioned to engage the guide rail of a selected station to cause the carriers to be diverted from the main conveyer onto said selected station.

A further object is to provide an improved mechanism for selectively diverting commodity carriers from a main conveyor onto a branch or storage line and comprising means whereby, when a certain branch conveyer has been filled with commodities, the diverting mechanism will be actuated to permit following commodities destined for the filled conveyer to pass thereby and be returned to the dispatcher's station.

A further object is to provide a conveying system comprising means for automatically returning to the dispatcher's station for redispatching, all commodity carriers not received at a branch or storage line, when such station has been filled to capacity.

A further object is to provide in combination with a conveying system comprising a main conveyer and a plurality of branch conveyers, a switch mechanism for selectively diverting commodity carriers or commodities from the main conveyer onto a selected branch conveyer, said switch mechanism having a greater flexibility than has heretofore been inherent in systems of this general character and, at the same time, providing such a mechanism comprising comparatively few moving parts, whereby the installation and maintenance costs are reduced to a minimum.

A further and more specific object of the invention is to provide in combination with a conveying system comprising a main conveyer and a plurality of branch conveyers leading therefrom, a plurality of switch mechanisms, one situated at each branch conveyer, and each of said switch mechanisms comprising a fixed rail, which rails are situated at different locations crosswise of the main conveyer and also at different elevations, and a plurality of sockets being provided upon the commodity carrier adapted to receive a control pin, the spacing of said sockets crosswise of the carrier corresponding to the crosswise spacing of said rails, and said sockets also being situated at different elevations corresponding to the elevations of said switch rails whereby, when a control pin is positioned in a certain socket of a carrier, it will engage only the switch rail related to said socket, said control pin passing uninterruptedly past all other switch rails.

The primary object of the invention, therefore, is to provide a simple and inexpensive switch mechanism for selectively diverting commodity carriers from a main conveyer onto a selected branch conveyer and whereby, when the selected branch conveyer has been filled with commodities, following commodities directed to said branch conveyer will be returned to the dispatcher's station for redispatching.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a plan view showing a main conveyer having a branch conveyer leading therefrom, and the improved switch mechanism embodied in the construction thereof;

Figure 2 is a side elevation of Figure 1, showing the switch mechanism at the left hand side of the figure in inoperative position while that at the right hand side of the figure is shown in normal operative position;

Figure 3 is an enlarged cross-sectional view on the line 3—3 of Figure 2, showing the means provided upon the carriers for supporting the control pins, and also showing in full and dotted lines the relative positions of the control pins and their respective switch rails;

Figure 4 is a view similar to the upper portion of Figure 3 but showing the control pin positioned in a different socket;

Figure 5 is an enlarged detail sectional plan view on the line 5—5 of Figure 2, showing the guide means for the gate;

Figure 6 is a plan view of one of the carriers;

Figure 7 is an enlarged detail sectional view showing one of the control switches;

Figure 8 is a diagrammatic view illustrating a conveying system comprising a main conveyer, a dispatcher's station, three branch conveyers, and the return conveyer for returning the overflow carriers to the dispatcher's station; and Figure 9 is a wiring diagram showing the electrical connections between the gate and control switches.

In the selected embodiment of the invention here shown, for purposes of disclosure, there is illustrated in Figure 1, a main conveyer 2 of the power-operated type, comprising a power driven belt 3 supported upon suitable rollers 4, as best shown in Figure 2. The main line conveyer 2 is shown supported upon a suitable structural frame comprising a plurality of uprights 5, spaced along the conveyer. The power driven belt 3 may be driven by suitable means, not shown.

Figure 8 diagrammatically illustrates a conveying system comprising a dispatcher's station 7 and a plurality of branch conveyers 8, 9, and 10, leading from the main line conveyer 2 to a predetermined destination such, for example, as storage bins, machines, or to other buildings. The commodities may be delivered to the dispatcher's station by means of a suitable supply conveyer 11. A suitable switch mechanism is provided at the junction of each branch conveyer with the main line conveyer for selectively diverting commodities from the main line conveyer onto the branch conveyers. This switch mechanism will subsequently be described.

In the conveying system illustrated in Figure 8, commodity carriers or commodities not received at any of the branch conveyers, will travel to the end of the main line conveyer 2 and around a return bend or loop conveyer 12 to a return conveyer 13, also preferably of the power-operated type similar to the upper main line conveyer 2. The loop conveyer section 12 may be of the gravity roller type. Commodities delivered from the upper conveyer 2 to the lower conveyer 13 will be returned to the dispatcher's station 7 for redispatching. To elevate the commodities or conveyers from the lower return conveyer 13 to the upper main line conveyer 2, a suitable elevator indicated at 14 in Figure 8 may be provided to elevate the commodities onto a curved gravity roller conveyer section 15, over which the commodities will travel by gravity to the dispatcher's station 7. In Figure 8, three branch conveyers are shown, but obviously this number may be varied, depending upon the requirements of each particular installation.

In the conveying system herein disclosed, the commodities to be conveyed are transported over the system by means of suitable carriers 16, preferably box-like in construction, as shown in Figure 6, and provided at each end with a group of sockets 17, 18, 19, 21, 22, 23, and 24. The sockets of each group are arranged in spaced relation cross-wise of the carrier, as best shown in Figure 6, and at different elevations, as shown in Figures 3 and 4. Two control pins 25 are preferably used on each carrier positioned in the corresponding sockets at each end of the carrier, as illustrated in Figure 2.

As hereinbefore stated, a suitable switch mechanism is provided at the junction of each branch conveyer with the main line conveyer for selectively diverting the commodity carriers from the main line conveyer onto a selected branch conveyer. To simplify the explanation of the invention, these junctions will hereinafter be referred to as stations A, B, and C, it being understood that the number of stations may be varied, as required. As the switch mechanism at the various branch stations are substantially alike in construction, but one will be described in detail.

The switch mechanism is best shown in Figures 1 and 2, and comprises a rail 26 fixedly mounted over each station A, B, and C, and supported upon a suitable structural frame comprising uprights 27, 28, and 29, here shown U-shaped in form and secured to the side rails of the main line conveyer 2. Each rail 26 is here shown comprising two sections 30 and 32, having their ends spaced apart to provide a gap 35 therebetween. (See Figure 5.) The section 30 is disposed substantially in parallel relation to the main line conveyer 2, and the section 32 is arranged at an incline with respect to the main line conveyer and is adapted to be engaged by the control pins 25 of certain carriers, whereby said carriers will be diverted from the main line conveyer onto a selected branch conveyer.

To simplify construction, the sections 30 and 32 of the switch rail 26 are preferably constructed of angle iron, and each has one web disposed vertically and adapted to be engaged by the control pins on the carrier, as shown in Figure 2. The gaps 35 are so situated that when the gap 35 at a selected station is open, the control pins upon a carrier directed to said selected station will pass through the gap 35 and thus permit the carrier to pass onwardly over the main line conveyer to be returned to the dispatcher's station 7, as hereinbefore stated.

The gap 35 between the ends of the rail sections 30 and 32 of each rail is normally closed by means of a gate 36 slidably mounted in a suitable guide 37, comprising a horizontal web 31 whereby it may be supported upon and secured to the ends of the rail sections 30 and 32 so as to bridge the gap 35 therebetween. The gate 36 is adapted to be actuated by a solenoid 38 supported by suitable cross members 39 secured to the upper ends of a pair of upright posts 41, as shown in Figures 1 and 2. The armature 42 of the solenoid 38 is pivotally connected to the upper end of the gate or plate 36 so that when the solenoid is energized and the armature is pulled upwardly, the gate will be moved upwardly thereby to the position shown at the left hand side of Figure 2. At the right hand side of this same figure, the gate is shown in its normal operative position, wherein it will be noted that the shoulders 43—43, provided at the upper portion of the gate 36 will be engaged with the guide 37. The lower portion of the gate or plate 36 is adapted to close the gap 35, and one surface thereof is substantially flush with the adjacent outer surfaces of the rail sections 30 and 32, as shown in Figures 3 and 5 so that when the gate at station A is in its normal position and the branch conveyer 8 is in condition to receive additional carriers, the carriers will be diverted onto said branch conveyer until the gate 36 is eventually actuated by energization of the solenoid 38 and elevated to its inoperative position, shown at the left hand side of Figure 2, as will subsequently be described.

Another feature of the invention resides in the means provided at each branch conveyer for preventing the further diversion of carriers thereto, when a branch conveyer has been filled to capacity. Such means is shown in Figures 1, 2, 7, and 9, and comprises a plurality of control switches 44, 45, 46, 47, and 47a, and 48 and 48a, situated substantially as illustrated in Figure 1. Figure 7 clearly illustrates the construction of said switches and as they are all substantially alike in construction, and of the same general type, but one need be described in detail. As shown in Figure 7, each control switch comprises a casing 51 provided with suitable apertures 52 whereby it may be secured in position by suitable rivets or bolts, not shown. A fixed contact 53 is secured to a terminal post 54 provided within the casing 51. A complemental contact 55 is supported upon an arm 56 pivotally mounted on a pin 57 within the casing and fixedly secured to an arm 58 also mounted upon the pin 57. The arm 58 projects through a slot in a wall of the casing 51, so that when it is actuated, the movable contact 55 may be moved into and out of electrical connection with the fixed contact 53. The contact 55 has a terminal post 59, and a spring 60 constantly urges the arm 56 in a direction to move the contact 55 out of engagement with the fixed contact 53. Each arm 58 is shown provided with an anti-friction roller 61. The anti-friction rollers 61 of the control switches 44 and 45 are adapted to be engaged by the walls of the carriers 16 as they enter a station, as will be understood by reference to Figure 1, and the roller 61 of the control switch 46 is adapted to be engaged by the gate 36, when the latter is moved to its inoperative position, as shown at the left hand side of Figure 2.

Each branch conveyer comprises a plurality of gravity rollers 62 and 63, supported in suitable side rails 64, and the gravity rollers 63 each have one end mounted for vertical movement, the shaft ends 65 of said rollers projecting through slotted openings provided in the rails 64 adjacent to their respective control switches. The shafts of the gravity rollers 62 and 63 are non-rotatably mounted in the side rails 64, and each shaft end 65 has a wear plate 66 secured thereto adapted to be engaged by the anti-friction rollers 61 of the control switches 47 and 47a, and 48 and 48a. The springs 60 of the control switches are sufficiently strong to overcome the weights of the adjacent ends of the rollers 63 so that the latter will normally be retained in elevated positions, when the conveyer is empty.

Before describing the operation of this novel conveying system, it is to be understood that the switch rails 26 at the branch conveyers are situated at different locations crosswise of the main line conveyer 2, as clearly illustrated in Figures 1, 3, and 8, this lateral spacing corresponding to the spacing between the sockets of each group of sockets provided at the ends of the carriers 16. It is further to be noted by reference to Figures 3 and 4, that the sockets of each group of sockets at each end of the carriers, are situated at different elevations and also, that the switch rails 26 are situated at different elevations, corresponding to the vertical spacing between the sockets 17, 18, 19, 21, 22, 23, and 24 provided at each end of each carrier. Thus, when the control pins 25 are positioned in the sockets 18 of a carrier, as shown in the drawings, they will pass beneath the switch rail 26 at station A and will engage the switch rail 26 at station B, whereby the carrier will be diverted onto the branch conveyer 9 at station B. If the control pins are positioned in the sockets 19 of a carrier, the upper ends thereof will be positioned at an elevation below the lower edges of the switch rails 26 at stations A and B, whereby the pins will pass beneath said rails without interference, until the carrier reaches station C, where they will engage the switch rail 26 of that station, because of it being so situated as to be directly in the path of the approaching pins, as will be noted by reference to Figure 3. It therefore follows that carriers having their control pins positioned in the sockets 18, will be diverted onto the branch conveyer 9 at station B. In like manner, if the control pins are positioned in the sockets 19 of the carrier, they will pass beneath the switch rails 26 at stations A and B and will engage the switch rail 26 at station C, thereby causing such carriers to be diverted from the main conveyer at that station. It will thus be seen that the positioning of the control pins upon the carriers determines the stations to which the carriers are to be delivered.

The control switches 44 to 48, inclusive, are preferably electrically connected as shown in Figure 9. The solenoid 38 is connected by wires 69 and 71 to one side of a cutout switch 72, the other side of which is connected by wires 70 and 73 to the main line conductors 74 and 75, respectively. The cutout switch 72 is adapted to be actuated by a solenoid 76 having an armature 77 connected with the movable contacts of the switch 72. One side of the solenoid 76 is connected by a wire 78 to the main line conductor 74 and the opposite end thereof has a wire 79 connecting it with the terminal 59 of the control switch 46. The terminal 54 of the switch 46 has a wire 81 connecting it to the terminal 54 of the switch 44. A wire 82 connects the terminal 59 of the switch 44 with the main line conductor 75, and the switch 45 is connected in parallel with the switch 44 by wires 83 and 84.

The control switches 47—47a and 48—48a, mounted on the branch conveyers are connected in the circuit, as shown in Figure 9. A wire 85 connects the wire 79 with the terminal 54 of the switch 47, and the terminal 59 of this same switch has a wire 86 connecting it with the terminal 54 of the switch 48. A wire 87 connects the terminal 59 of the switch 48 with the wire 82. The control switches 47a and 48a are connected in parallel with the control switches 47 and 48, as shown.

The cutout switch 72 controlling the flow of current to the solenoid 38 which actuates the gate 36, is normally in open position, as shown in Figure 9, because of the solenoid 76 being deenergized as a result of the control switches 44—46—47 and 48 normally being open. The gate 36 is therefore normally positioned as shown at the right hand side of Figure 2, it being held in such position by means of gravity or suitable tension means.

The switches 44 and 45 at each station are so situated that each time a carrier passes through a station, the side walls of the carrier will actuate the arms 58 of said switches and close the contacts thereof. This, however, will have no effect upon the gate 36 unless the switch 46 is closed. The switch 46 is normally in open position, and is only closed when the gate is moved to its inoperative position, as shown at the left hand side of Figure 2. The switch arms 58 of the switches 47—47a and 48—48a normally retain the adjacent ends of their respective rollers 63 in elevated positions above the rollers 62, so that each time a carrier is diverted onto a selected branch conveyer, the rollers 66 of switches 47 and 47a of said selected branch conveyer will first be depressed and cause the control switches 47 and 47a thereof to be temporarily closed, after which the switches 48 and 48a will be closed in a similar manner. These latter switches, however, will not be closed until after the carrier has passed completely over the switches 47 and 47a and the latter have been opened by the actions of their springs 60. The spacing between the control switches 47—47a and 48—48a is greater than the overall length of the carrier so that a single carrier can only close one set of these switches at a time.

If, however, the conveyer becomes filled with carriers, as indicated at station B, in Figure 8, the switches 47—47a and 48—48a will all be closed, thereby causing the solenoid 76 to become energized as will readily be understood by reference to Figure 9, causing the cutout switch 72 to be closed and therefore the solenoid 38 to become energized. Such energization of the solenoid 38 will move the gate 36 from the position shown at the right hand side of Figure 2, to that shown at the left hand side of this same figure, whereby the lower portion thereof will be out of the path of the control pins 25, positioned upon the carrier directed to the selected branch conveyer which has been filled to capacity. When the gate at said station is thus positioned, the control pins 25 will pass through the gap 35 in the switch rail 26 at that station, and the carrier will continue onwardly over the main line conveyer 2 and will be returned to the dispatcher's station 7 for redispatching, as hereinbefore stated.

The control switches at each branch conveyer are so situated and interconnected, that when a selected branch conveyer has been filled to capacity, and an approaching carrier enters the station of said filled branch conveyer, it will actuate the switch 44 whereby a second circuit will be closed through the solenoid 76 as follows: wire 78, solenoid 76, wire 79, switch 46, wire 81, switch 44, and wire 82. This second circuit will function as a holding circuit to keep the switch 72 in closed position while the carrier passes through the station, should the carriers on the filled branch conveyer begin to move thereon and permit the switches 47 and 47a to open. Before the carrier disengages the switch 44, it will actuate the switch 45 whereby the gate 36 will be retained in inoperative position until the carrier has passed completely through the station. When the carrier disengages the roller 61 of the switch 45, the holding circuit to the solenoid 76 will be broken, and the gate will return to its normal operative position to divert following articles directed to that particular branch conveyer to be diverted thereto.

By the provision of the two switches 44 and 45 in connection with the switch 46, the gate 36 will be positively held in inoperative position while the carrier passes through the station or until the control pin at the rear end of the carrier has passed through the gap 35. By providing two sets of control switches on each branch conveyer, as hereinbefore described, one switch of each set of said switches will always be closed when the branch conveyer is filled to capacity, regardless of the positions of the carriers thereon, thereby assuring that the solenoid 76 will be actuated to close the cutout switch 72, whereupon the gate 80 will be moved to its inoperative position to prevent further diversion of carriers to that particular branch line. As soon as the carriers positioned upon the filled branch conveyer begin to move thereon, and the switches 47 and 47a are opened, the solenoid 76 will become deenergized, causing the cutout switch 72 to automatically open whereby the gate 36 will return to its normal operative position, as shown at the right hand side of Figure 2.

By means of this novel switch mechanism, it will therefore be seen that under normal operating conditions, the conveying system cannot become blocked or jammed at the junctions or stations A, B, and C, when a branch line conveyer is filled to capacity.

In the drawings, the carrier is shown provided at each end with seven sockets, while in Figure 8, but three branch stations are shown. It is to be understood, however, that because of the pins all being of the same size, a set of sockets is provided on each carrier for each branch line. Two pins are used on each carrier so that the carrier will be diverted from the main line conveyer onto the selected branch conveyer with the least amount of shock. This is accomplished by positively guiding each end of the carrier from the main conveyer onto the selected branch conveyer. In operation, the pin at the leading end of the carrier first engages the switch rail 26 whereby the forward end of the carrier is diverted from the main line conveyer, and thereafter the pin at the rear end of the carrier engages the switch rail, whereby the carrier will be diverted from the main line conveyer onto the branch conveyer substantially without shock. By arranging the switch rails 26, and also the sockets provided upon the carriers, as herein described, the structure is greatly simplified in that the pins may all be made the same size, and the only moving parts required at each branch station reside in the switch gate 36, which, as hereinbefore stated, are actuated only in the event that their respective branch lines become filled to capacity.

I claim as my invention:

1. In a conveying system, a main conveyer, a plurality of stations, a carrier adapted to travel over said system, a vertically movable diverting member at each station, said members being situated at different locations crosswise of the conveyer and at different elevations, and a control means positioned on the carrier to engage the diverting member of a selected station whereby the carrier will be diverted from the conveyer onto said selected station by said member, and a plurality of control elements for controlling the operation of said diverting member, said control elements being so associated with one another and with said diverting member that when carriers accumulate on said selected station, certain of the control elements thereof will cooperate to cause the diverting member thereof to move to inoperative position, whereby a following carrier directed to said selected station will pass uninterruptedly thereby.

2. In a conveying system, a conveyer, a plurality of stations, carriers for conveying articles over the system, a diverting member at each station, means adapted to be positioned on a carrier to engage the diverting member of a selected station whereby said carrier will be diverted from the conveyer onto said selected station, an actuator for each diverting member, and a series of interconnected switches at each station electrically associated with the actuators of the diverting members of their respective stations, the switches of each station being so arranged that when a plurality of carriers are located at a certain station adjacent to said conveyer, certain of said switches will be actuated to cause the diverting member of said certain station to be moved to inoperative position to permit a following carrier directed to said certain station to pass uninterruptedly thereby, and another of said switches being positioned to be actuated by said following carrier, while passing through said station, to thereby cause said diverting member to be retained in inoperative position while said following carrier passes through said station, should the carriers located at said station adjacent to the conveyer be removed therefrom during passage of said following carrier through said station.

3. In a conveying system, a main conveyer, a plurality of branch conveyers, carriers for conveying articles over the system, a diverting member at each branch conveyer, a control pin adapted to be positioned on a carrier to engage the diverting member of a selected branch conveyer whereby said carrier will be diverted from the conveyer onto said selected branch conveyer, an actuator for each diverting member, a group of interconnected switches associated with the actuator of each branch conveyer, certain of the switches of each branch conveyer being positioned to be actuated by carriers delivered thereto, whereby when a plurality of carriers are positioned on a selected branch conveyer, adjacent to the main conveyer, the actuator thereof is operated to move its associated diverting member to inoperative position, whereby a following carrier directed to said selected branch conveyer will pass uninterruptedly thereby, and another of said switches being positioned to be actuated by said following carrier, while passing through said station, to thereby cause said diverting member to be retained in inoperative position while said following carrier passes through said station, should the carriers positioned on said selected branch conveyer be removed therefrom during passage of said following carrier through said station.

4. In a conveying system including a plurality of stations, a main conveyer, a carrier adapted to travel over said conveyer, a switch mechanism at each station comprising a fixed rail, said rails being situated at different elevations, a control pin, and means on the carrier by which said control pin may be adjusted both vertically and laterally to cause it to engage the rail of a selected station, whereby the carrier will be diverted from the conveyer at said selected station.

5. The combination with a conveying system comprising a dispatcher's station, a main conveyer, and a plurality of branch stations, of a carrier adapted to travel over said conveyer, a switch mechanism at each branch station including a rail having a gap therein, said rails being situated at different elevations, means normally closing said gap, a control pin adjustably mounted upon said carrier adapted to be positioned to engage the switch rail of a selected branch station, whereby the carrier will be diverted from the main conveyer at said selected station, and means at each branch station operatively associated with said gap-closing means whereby, when a selected station has been filled to capacity, following carriers directed to said filled station will be returned to the dispatcher's station for redispatching.

6. In a conveying system, a main conveyer comprising a plurality of stations, a carrier adapted to travel over said main conveyer, a switch mechanism at each station comprising a fixed rail, said rails being situated at different locations crosswise of the conveyer and at different elevations, and a control pin mounted upon said carrier adapted to be positioned to engage the rail of a selected station, whereby the carrier will be diverted from the main conveyer at said selected station.

7. In a conveying system, a main conveyer having a plurality of branch conveyers leading therefrom, a carrier adapted to travel over said main conveyer, a switch mechanism at the junction of each branch conveyer each comprising a gate mounted for vertical movement and each normally retained in operative position, a control pin, and means on the carrier by which said control pin may be adjusted both vertically and laterally to cause it to engage the switch gate of a selected branch conveyer whereby the carrier will be diverted from the main conveyer onto said selected branch conveyer.

8. In a conveying system, a main conveyer having a plurality of branch conveyers leading therefrom, a carrier adapted to travel over said main conveyer, a switch mechanism at the junction of each branch conveyer each comprising a rail having a gap therein, a vertically movable gate normally closing said gap, means for operating said gate a control pin adjustably mounted upon said carrier adapted to be positioned to engage the switch gate of a selected branch conveyer whereby the carrier will be diverted from the main line conveyer onto said selected branch conveyer, and electrical control means on each branch conveyer adapted to be actuated by carriers diverted thereto and cause said gate operating means to operate and move the gate into inoperative position, when a selected branch conveyer has been filled to capacity, whereby following carriers directed to said selected branch conveyer may travel uninterruptedly over the main line conveyer.

9. In a conveying system, a main conveyer having a plurality of branch conveyers leading therefrom, a carrier adapted to travel over said conveyers, a diverting mechanism at the junction of each branch conveyer each comprising a vertically movable gate, independent means for operating said gate a control pin adjustably mounted upon each end of said carrier adapted to be positioned to engage the diverting gate of a selected branch conveyer whereby the carrier will be diverted from the main conveyer onto said selected branch conveyer, control switches on said branch conveyers for controlling the operations of the gate operating means thereof the control switches of each branch conveyer being adapted to be actuated by carriers passing thereover, and the switches at each branch conveyer also being so situated with respect to one another that when a selected branch conveyer has been filled to capacity, carriers accumulated thereon will actuate the control switches of said filled branch conveyer and cause the gate operating means thereof to operate and move said gate into inoperative position, whereby following carriers directed to said station will pass thereby.

10. In a conveying system, a main conveyer having a plurality of branch conveyers leading therefrom, a carrier adapted to travel over said main conveyers, a switch mechanism at the junction of each branch conveyer comprising a guide rail mounted over the main conveyer, said rails being mounted at different elevations and situated at different locations crosswise of the main conveyer, a control pin on the carrier adapted to be positioned to engage the switch rail of a selected branch conveyer, and means on the carrier whereby said control pin may be adjusted both vertically and laterally to cause it to engage the guide rail of a selected branch conveyer, whereby the carrier will be diverted from the main conveyer onto said selected branch conveyer.

11. In a conveying system, a main conveyer comprising a plurality of branch conveyers, commodity carriers adapted to travel over said main conveyer, a switch mechanism at each branch conveyer comprising a rail, said switch rails being mounted at different elevations and situated at different locations crosswise of the main conveyer, a control pin mounted on each carrier, and each carrier having a plurality of sockets arranged in spaced relation crosswise thereof and situated at different elevations and adapted to receive a control pin, and whereby the control pin of each carrier may be adjusted both vertically and horizontally so as to cause it to engage the switch rail of a selected branch conveyer, whereby the carrier supporting the pin will be diverted from the main line conveyer onto said selected branch conveyer.

12. In a conveying system, a main conveyer having a plurality of branch conveyers leading therefrom, a diverting mechanism at each branch conveyer comprising a movable member, carriers adapted to travel over said main conveyer, each carrier having a group of sockets at each end thereof and the sockets of each group being arranged at different elevations and situated at different locations crosswise of the carrier, and control pins adapted to be received in corresponding selected sockets of each group of sockets and positioned to engage the movable member of the diverting mechanism of a selected branch conveyer, whereby the carrier will be diverted from the main line conveyer onto said selected branch conveyer, and means for moving said member out of the path of said control pins, when said selected branch conveyer has been filled to capacity.

13. In a conveying system, a main conveyer having a plurality of branch conveyers leading therefrom, a diverting mechanism at each branch conveyer comprising a movable member, means for operating said movable member carriers adapted to travel over said main conveyer, each carrier having a group of sockets at each end thereof and the sockets of each group being arranged at different elevations and situated at different locations crosswise of the carrier, control pins adapted to be received in corresponding selected sockets of each group of sockets and positioned to engage the movable member of the diverting mechanism of a selected branch conveyer, whereby the carrier will be diverted from the main line conveyer onto said selected branch conveyer, and a plurality of control switches on each branch conveyer adapted to control the operations of said movable member operating means, the switches of each branch conveyer being so interconnected that when certain of the switches of a selected branch conveyer are actuated by a carrier, the operating means associated therewith will operate to move its complemental movable member out of the path of said control pins.

14. In a conveying system, a main conveyer having a plurality of branch conveyers leading therefrom, an electrically operated switch mechanism at each branch conveyer, each comprising a movable gate, control switches operatively connected with said gates and situated to be actuated by carriers traveling over the main line conveyer, control switches also situated on each branch conveyer adjacent to the main conveyer adapted to be actuated by carriers traveling over said branch conveyers, the control switches on said branch conveyers being operatively connected with their respective switch gates, control pins on said carriers adapted to be positioned to engage the switch gate of a selected branch conveyer whereby a carrier may be diverted from the main line conveyer onto said selected branch conveyer, and the control switches on said branch conveyers being so situated that when a selected branch conveyer is filled adjacent to the main conveyer, the carriers accumulated thereon will actuate its control switches and cause the switch gate associated therewith to be moved to inoperative position, whereby following carriers directed to said filled branch conveyer will pass uninterruptedly thereby.

15. In a conveying system, a main line conveyer having a branch conveyer leading therefrom, a carrier adapted to travel over said system, control means on the carrier, an electrically operated diverting mechanism at the branch conveyer comprising a movable member adapted to be positioned to be engaged by the control means on said carrier and divert the carrier from the main line conveyer, and a plurality of control switches on the branch conveyer adapted to be actuated by carriers traveling thereover, said control switches being so situated that when the branch conveyer has been filled adjacent to the main line conveyer, the carriers accumulated thereon will actuate said switches and cause said movable member to be moved to an inoperative position, whereby following carriers directed to said filled branch conveyer will pass uninterruptedly thereby.

16. In a conveying system, a main line conveyer having a branch conveyer leading therefrom, a carrier adapted to travel over said system, control means on the carrier, an electrically operated diverting mechanism at the branch conveyer comprising a movable member adapted to be positioned to be engaged by the control means on said carrier and divert the carrier from the main line conveyer, a plurality of control switches on the branch conveyer adapted to be actuated by carriers traveling thereover, said control switches being so situated that when the branch conveyer has been filled adjacent to the main line conveyer, the carriers accumulated thereon will actuate said switches and cause said movable member to be moved to an inoperative position, whereby following carriers directed to said filled branch conveyer will pass uninterruptedly thereby, and means for preventing said movable member from returning to operative position, when a following carrier is passing by said branch conveyer, said means comprising a control switch positioned to be engaged by the passing carrier, and another switch arranged to be actuated by the movable member, when the latter is in inoperative position.

17. In a conveying system, a main line conveyer having a plurality of branch conveyers leading therefrom, an electrically operated diverting mechanism at each branch conveyer, each comprising a movable member normally retained in operative position, carriers adapted to travel over said conveying system, control pins adjustably mounted upon said carriers and positioned to cause certain carriers to be diverted onto a selected branch conveyer, a plurality of control switches mounted on each branch conveyer and spaced apart lengthwise thereof, said switches being electrically connected with said diverting mechanism and so positioned upon their respective branch conveyers that when a selected branch conveyer has been filled adjacent to the main line conveyer, the control switches of said filled branch conveyer will be actuated to cause the diverting mechanism associated therewith to move into inoperative position, whereby following carriers directed to said filled branch conveyer may pass uninterruptedly thereby.

18. In a conveying system, a main line conveyer, a branch conveyer leading therefrom, a carrier adapted to travel over said system, a control pin adjustably mounted on the carrier, a diverting member normally positioned to be engaged by a control pin on the carrier and whereby the carrier may be diverted from the main line conveyer onto the branch conveyer, electrical means for operating said diverting member, and a plurality of control switches for controlling the operation of said diverting member, some of said switches being positioned to be actuated by the passage of carriers over the branch conveyer, and other switches being positioned to be actuated by the passage of carriers over the main line conveyer, and by said diverting member, whereby said diverting member may be automatically rendered inoperable to divert carriers from the main line conveyer, when carriers accumulate on the branch conveyer adjacent to said main line conveyer.

19. In a conveying system, a main conveyer, a plurality of branch conveyers connected therewith, a carrier adapted to travel over said system, a vertically movable diverting member at each branch conveyer, said diverting members being situated over the main conveyer at different locations crosswise thereof and at different elevations, a control pin positioned on the carrier to engage the diverting member of a selected branch conveyer, whereby the carrier will be diverted from the main conveyer onto said selected branch conveyer, and a device made operable by carriers positioned on said selected branch conveyer to cause its diverting member to be elevated to an inoperative position whereby following carriers directed to said selected branch conveyer will pass thereby.

20. In a conveying system, a main conveyer, a plurality of branch conveyers connected therewith, a carrier adapted to travel over said system, a vertically movable diverting member at each branch conveyer, said diverting members being situated over the main conveyer at different locations crosswise thereof and at different elevations, a control pin positioned on the carrier to engage the diverting member of a selected branch conveyer, whereby the carrier will be diverted from the main conveyer onto said selected branch conveyer, means for rendering the diverting member of said selected branch conveyer inoperative, when said branch conveyer becomes filled with carriers, and means for preventing said diverting member from returning to its operative position while a following carrier, directed to said branch conveyer, passes therebeneath.

21. In a conveying system, a main line conveyer, a branch conveyer connected thereto, a carrier adapted to travel over said system, control means on the carrier, a diverting member at the branch conveyer adapted to be engaged by the control means on the carrier whereby the latter is diverted from the main line to the branch conveyer, a plurality of control elements at the branch conveyer operatively associated with said diverting member and positioned to be engaged by carriers accumulating on the branch conveyer adjacent to the main line conveyer, whereby said diverting member is moved to an inoperative position to thereby permit following carriers directed to said branch conveyer to pass uninterruptedly thereby, and means for positively retaining the diverting member in inoperative position while a carrier is passing the branch conveyer, should the carriers accumulated on said branch conveyer be removed therefrom while a following carrier is passing on the main line conveyer.

22. In a conveying system, a main line conveyer, a branch conveyer connected thereto, a diverting member for diverting commodities from the main line to the branch conveyer, a plurality of control elements on the branch conveyer for rendering said directing member inoperative, when a plurality of commodities are located on said branch conveyer adjacent to the main line conveyer, to thereby cause following commodities directed to the branch conveyer to pass uninterruptedly thereby, and another control element operatively associated with said diverting member and positioned to be engaged by a following commodity passing said branch conveyer, whereby the diverting member will be positively retained in inoperative position, while said following commodity passes by said branch conveyer, should the commodities positioned on the branch conveyer adjacent to the main line conveyer be removed therefrom, while a following commodity is passing on the main line conveyer.

EZRA M. YOST.